United States Patent [19]

Toganoh et al.

[11] Patent Number: 4,658,272

[45] Date of Patent: Apr. 14, 1987

[54] INK-SUPPLYING DEVICE

[75] Inventors: Shigeo Toganoh; Yohji Matsufuji; Hiroo Ichihashi, all of Tokyo, Japan

[73] Assignee: Canon Kabushiki Kaisha, Tokyo, Japan

[21] Appl. No.: 681,067

[22] Filed: Dec. 12, 1984

Related U.S. Application Data

[63] Continuation of Ser. No. 419,516, Sep. 17, 1982, abandoned.

[30] Foreign Application Priority Data

| | | | |
|---|---|---|---|
| Oct. 2, 1981 | [JP] | Japan | 56-157294 |
| Oct. 2, 1981 | [JP] | Japan | 56-157297 |
| Oct. 2, 1981 | [JP] | Japan | 56-157298 |
| Oct. 2, 1981 | [JP] | Japan | 56-157299 |
| Oct. 2, 1981 | [JP] | Japan | 56-157300 |
| Oct. 2, 1981 | [JP] | Japan | 56-157301 |
| Oct. 2, 1981 | [JP] | Japan | 56-157302 |

[51] Int. Cl.[4] .......... G01D 15/16

[52] U.S. Cl. .......... 346/140 R

[58] Field of Search .......... 346/140

[56] References Cited

U.S. PATENT DOCUMENTS

| | | | |
|---|---|---|---|
| 1,849,084 | 3/1932 | Hand | 346/140 X |
| 3,787,882 | 1/1974 | Fillmore | 346/75 |
| 4,038,667 | 7/1977 | Hou | 346/140 R |
| 4,189,734 | 2/1980 | Kyser | 346/140 X |
| 4,223,323 | 9/1980 | Bader | 346/140 |
| 4,296,421 | 10/1981 | Hara | 346/140 |
| 4,340,896 | 7/1982 | Cruz-Uribe | 346/140 R |
| 4,376,284 | 3/1983 | Bader | 346/140 R |
| 4,380,770 | 4/1983 | Maruyama | 346/140 R |
| 4,389,657 | 6/1983 | McMahon | 346/140 |
| 4,403,229 | 9/1983 | Barteck | 346/75 |
| 4,463,359 | 7/1984 | Ayata | 346/140 X |
| 4,468,680 | 8/1984 | Martner | 346/140 |

*Primary Examiner*—Joseph W. Hartary

*Attorney, Agent, or Firm*—Fitzpatrick, Cella, Harper & Scinto

[57] ABSTRACT

An ink-supplying device for feeding ink to a plurality of ink-jetting heads comprises an ink reservoir common to all the heads and ink-feeding means disposed parallel in the reservoir.

1 Claim, 4 Drawing Figures

INK-SUPPLYING DEVICE

This application is a continuation of application Ser. No. 419,516, filed Sept. 17, 1982, now abandoned.

BACKGROUND OF THE INVENTION

1. Field of the Invention

This invention relates to an ink-supplying device for an ink-droplet generator, particularly for an ink ejecting unit provided with a number of ink discharging orifices, namely, a multi-nozzle type of ink-jet recorder head.

2. Description of the Prior Art

Among a wide variety of recording systems hitherto known, a so-called ink-jet recording system, which is a non-impact type of recording method generating practically no noise during operation and which additionally permits high-speed recording on plain paper without any special fixing treatment, is very useful for developing various types of printers, including those for copying machines and word processors. Accordingly, various types of ink-jet recording system have been offered heretofore, some of which were further improved and commercialized and some of which are still on the way to practical use under continuous efforts.

The ink-jet recording system is a method of recording by flying droplets of recording liquid (referred to as "ink" in this specification) utilizing various operating principles to adhere to paper or other recording members. The ink-droplet generating device used for the ink-jet recording system i.e. the ink-jetting device, comprises generally ink-jetting heads (ink-jet recorder heads) for ejecting ink droplets and an ink-supplying device for feeding an ink to the heads.

The first form of said ink-jetting head is that generally called "single type" or "semi-multiple type", which has 1 to about 10 ink-discharging orifices. Since this form of ink-jetting head has a few ink-discharging orifices and consumes small amounts of ink, an ink-supplying device for this form of ink-jetting head can be relatively simply constructed by making use of an exchangeable ink tank of cartridge type and a single ink-supplying pipe.

On the other hand, another form of ink-jetting head, generally called "full-line multi-nozzle type", which prints letters or figures filling up one line of recording paper at nearly the same time, has a very large number of ink-discharging orifices and consumes ink incomparably larger amounts per unit time than the former simple form of ink-jetting head. Accordingly, an ink-supplying device for this full-line type of ink-jetting head is complicated in structure and large sized and requires special ink supply, thus needing considerably difficult techniques as compared with the former ink-supplying device.

At present, no practically useful ink-supplying device has yet been found that can supply ink to the full-line multiple type of ink-jetting head.

SUMMARY OF THE INVENTION

This invention aims at solving the foregoing problem to provide a practically useful ink-supplying device for the multiple type of ink-jetting head.

In other words, the first object of this invention is to provide a device for supplying ink stably to the multiple type of ink-jetting head for long hours.

The second object of this invention is to provide a device for supplying ink stably and uniformly to all parts of the multiple type of ink-jetting head.

The third object of this invention is to provide an ink-supplying device of easy maintenance.

According to one aspect of the present invention, there is provided an ink-supplying device for feeding ink to a plurality of ink-jetting heads, which comprises an ink reservoir common to all the heads and ink-feeding means disposed parallel in the reservoir.

According to another aspect of the present invention, there is provided an ink-supplying device which comprises a container for reserving an ink to be fed to a plurality of ink-jetting heads, said container being partitioned with a filter into two regions, one region being provided with an ink inlet port and the other region being provided with plural ink-feeding means corresponding to all the ink-jetting heads.

According to a further aspect of the present invention, there is provided an ink-supplying device which comprises respective ink-feeding lines for a plurality of ink-jetting heads, said lines being connected to a single ink reservoir and having approximately the same length.

According to a still further aspect of the present invention, there is provided an ink-supplying device in which an ink-jetting head is connected with a means which sucks ink from an ink reservoir and feeds the ink with pressure to the ink-jetting head.

According to a still further aspect of the present invention, there is provided an ink-supplying device which comprises a first route from an ink reservoir to a pumping means and a second route from the pumping means to an ink-jetting head, the first route having a valve which is opened during the suction stage of the pumping means and closed during the discharge stage, and the second route having a valve which is closed during the suction stage of the pumping means and opened during the discharge stage.

BRIEF DESCRIPTION THE DRAWINGS

DETAILED DESCRIPTION OF THE INVENTION

Figure 1:
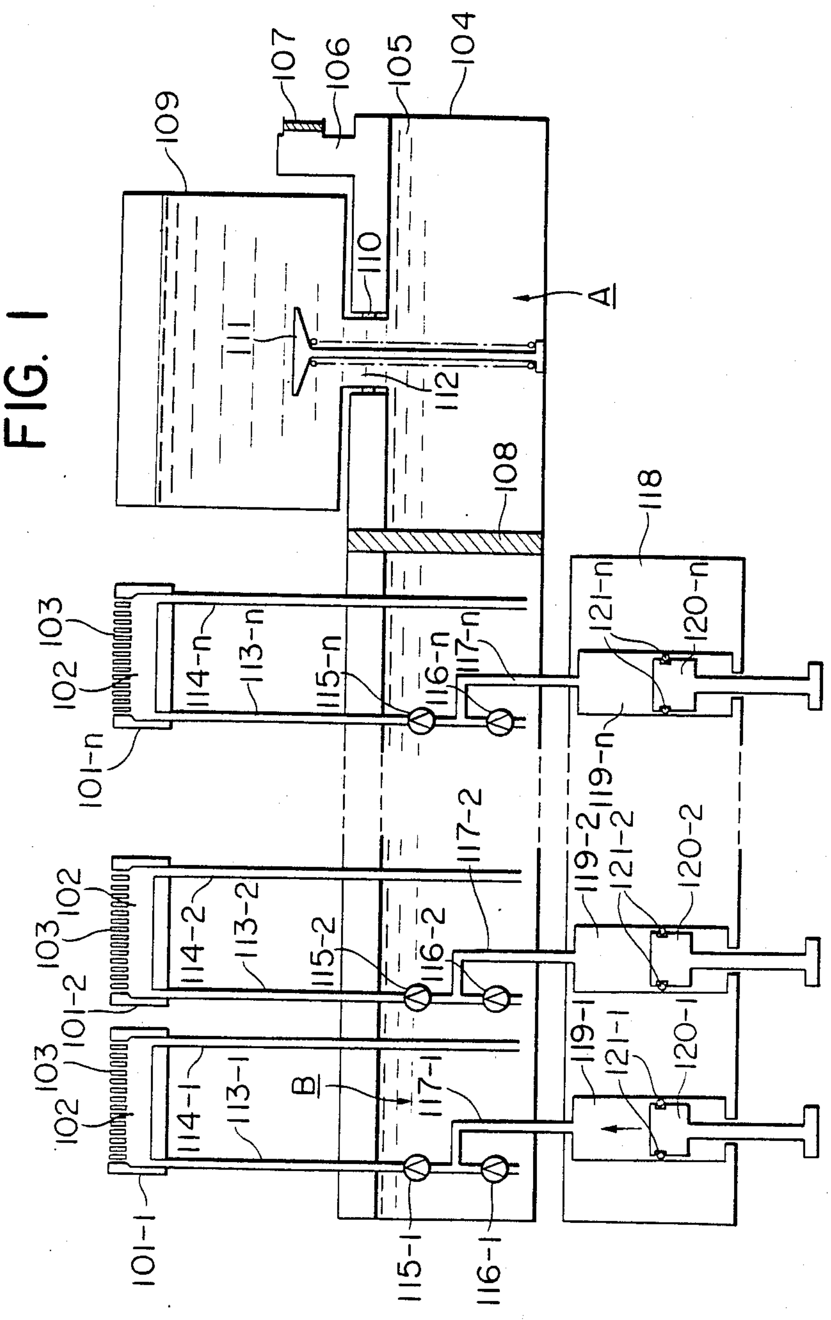
FIG. 1 is a schematic illustration of a preferred embodiment of this invention.

Referring now to the drawings, this invention is described in detail.

In FIG. 1, a schematic illustration of a preferred embodiment of this invention, 101-1, 101-2, . . . , **101-*n* are ink-jetting heads each provided with a plurality of orifices 103 for jetting ink and an intermediary ink chamber 102 communicating with the orifices 103. Further, 113-1, 113-2, . . . , 113-*n* and 114-1, 114-2, . . . , 114-*n* are feed pipes for feeding ink 105 stored in an ink reservoir 104 to the heads 101-1, 101-2, . . . , 101-*n* and are provided with check valves 115-1, 115-2, . . . , 115-*n* and 116-1, 116-2, . . . , 116-*n*. The ink reservoir 104 is provided with an ink inlet port 112 and a vent 106 which communicates with the atmosphere through a filter 107. The interior of the ink reservoir 104 is partitioned by a filter 108 into two rooms, one (room A) having the ink inlet port 112 and the other (room B) having the feed pipes 113-1, 113-2, . . . , 113-*n* and 114-1, 114-2, . . . , 114-*n* inserted thereinto. A cylinder block 118 admits cylinders 119-1, 119-2, . . . , 119-*n* corresponding to the heads 101-1, 101-2, . . . , 101-*n*, respectively. Each cylinder has a piston 120 inside and is connected through a pipe 117 to the feed pipe 113 at the position between the check valves 115 and 116. A removable tank 109 for ink supplement having a liquid-level control valve 111 is mounted to the ink reservoir 104**.

The ink supply from the ink reservoir 104 to the ink-jetting heads 101-1, 101-2, . . . , **101-*n* is illustrated below, referring to the head 101-1. The initial ink supply to the head 101-1 is performed as follows: The tank 109 filled with ink is connected with the ink inlet port 112 of the ink reservoir 104. Then, the liquid-level control valve 111 is opened to allow the ink in the tank 109 to drop naturally into the reservoir 104 while replacing the air. When the ink level in the reservoir 104 reaches the position of the liquid-level control valve 111, the opening of the valve 111 is closed with ink and the ink in the tank 109 becomes not replaceable by the air and stops therefore transferring from the tank 109 to the reservoir 104. Additionally speaking, air does not move from the room B to the room A in the reservoir 104 during the natural dropping of ink because the filter 108 between the rooms B and A gets wet completely with ink at this time. When ink moves from the room A to the room B, dust, other solid contaminant particles, and bubbles in the ink are caught by the filter 108. Accordingly, such particles or bubbles do not enter the room B even if the ink in the tank 109 is contaminated therewith. Thus, the ink supplied from the room B to the ink-jetting head 101-1 is completely free from materials causing defective ejection of ink droplets. When the tank 109 is connected with the ink reservoir 104 through an O-ring 110 or the tank 109-reservoir 104 connecting section is sealed with ink, the ink in the room A does not enter the room B if no air is supplied to the room A, and in consequence the ink levels in the rooms A and B do not reach the same height. For this reason, the vent 106 of the ink reservoir 104 and the ink inlet port 112 are required to be positioned on the same side of the filter 108. In addition, the ink level in the reservoir 104 should be set to such a height that the ink pressure in the ink-jetting head 101-1 may be negative vs. the atmospheric pressure, thereby preventing natural dribbling of ink from the orifices 103 of the head 101-1**.

Under the condition that the ink reservoir 104 is filled with ink in the above-mentioned way, the piston 120-1 is pushed in the arrow direction to expel the air from the cylinder 119-1 through the pipe 117-1. Then, the piston 120-1 is pulled in the direction opposite to the arrow to suck the ink from the reservoir 104 through check valve 116-1 and the pipe 117-1 into the cylinder 119-1. The piston 120-1 is pushed again in the arrow direction to force the ink to enter the ink-jetting head 101-1 from the cylinder 119-1 through the pipe 117-1, the check valve 115-1, and the feed pipe 113-1. This operation of the piston 120-1 is continued until the ink fills the head 101-1 and goes back to the ink reservoir 104 through the feed pipe 114-1 to expel the air (bubbles) completely from the feed pipes 113-1 and 114-1 and the ink-jetting head 101-1.

After the ink-jetting head 101-1 has been filled with ink, the ink supply to the head 101-1 during its operation to eject ink droplets is effected by the action of capillary force through the feed pipes 113-1 and 114-1. Accordingly, the check valves 115-1 and 116-1 are desirably opened with a minimum forward pressure; it is undesirable that the ink level in the ink reservoir 104 should be excessively lower than the position of the ink-jetting head 101-1. In actual use, the difference between said ink level in the ink reservoir 104 and the position of the head 101-1 is desired to be within the range of approximately 0–100 mm.

If the ink-jetting head 101-1 is contaminated with bubbles, dust, or other foreign material and thereby the ejection of ink droplets becomes unstable, the proper ejection of ink droplets can be readily restored by circulating ink between the ink reservoir 104 and the ink-jetting head 101-1 in the same manner as used for the above-illustrated initial ink supply to the head 101-1.

While the above explanation has been made referring to the head 101-1, these operations can also be applied to the other heads 101-2, . . . , **101-*n***, including the initial ink supply to the heads, the ink supply during recording operation of the heads, and the restoration of proper ink ejection.

Secondly, a modified embodiment of this invention is illustrated with reference to FIG. 2, which is an exploded view of the embodiment.

Figure 2:
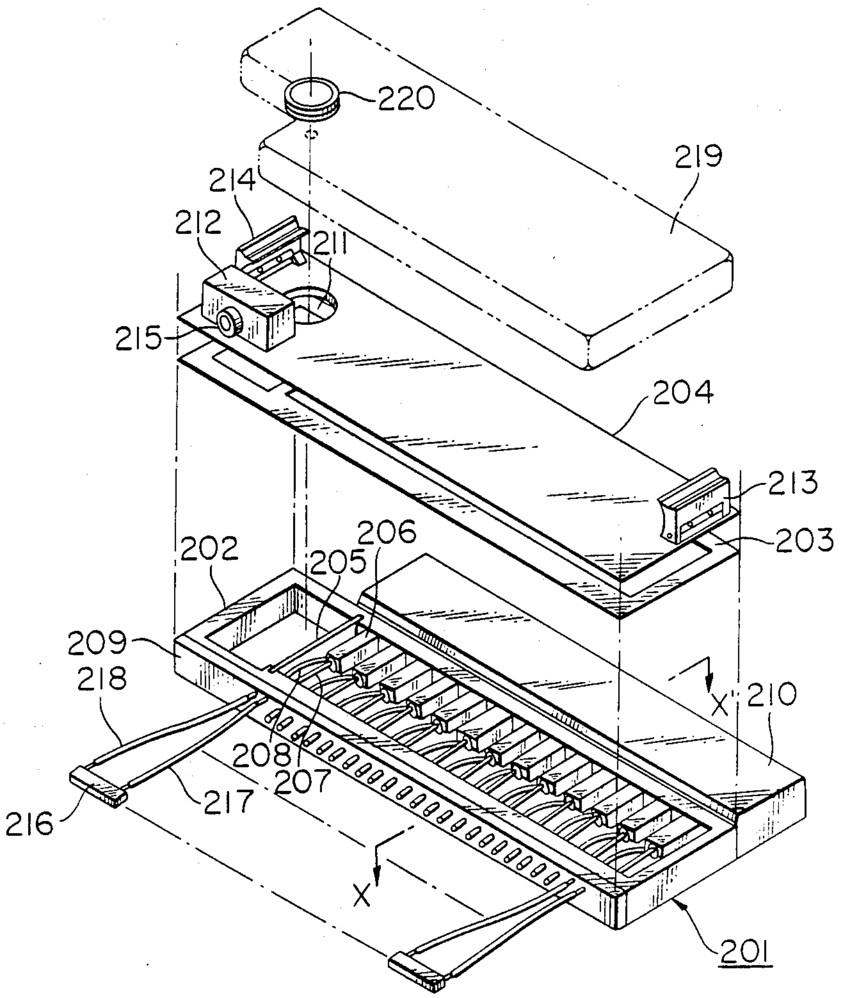
FIG. 2 is an exploded view of a modification of the embodiment shown in FIG. 1.

In FIG. 2, 201 is an ink reservoir comprising an ink container 202, packing 203, and a top cover 204. The ink container 202 has therein a filter 205 and a plurality of check valves 206, each connected with two ink-feeding pipes 207 and 208. A pipe guide plate 209 and a cylinder block 210 are attached to the front and rear outer walls, respectively, of the ink container 202.

The top cover 204 is provided with an ink inlet port 211, a vent block 212, and fasteners 213 and 214 to hold an ink-supplementing tank 219. A filter block 215 is attached to the vent block 212.

The top cover 204 with the packing 203 is tightly joined onto the ink container 202 by thread connection or other joining means. These can also be assembled into a single body by means of adhesives, where the packing 203 is not always necessary.

A multi-nozzle ink-jetting head 216 is connected to the ink-feeding pipes 207 and 208 through ink-feeding tubes 217 and 218, respectively. The head 216 and the tubes 217 and 218 communicated with the inside of the ink reservoir 201 through the pipes 207 and 208, respectively.

The ink-supplementing tank 219 has an ink-injecting means 220 for supplying ink to the ink reservoir 201 through the ink inlet port 211 of the top cover 204 to keep the ink level constant in the reservoir 201. This ink-supplementing tank 219 is readily removable, as necessary, to be exchangeable with another one filled with ink.

The ink supply from the ink reservoir 201 to the multi-nozzle ink-jetting head 216 is illustrated below. First, the initial ink supply from the ink reservoir 201 to the multi-nozzle ink-jetting head 216 is carried out as follows: The ink-supplementing tank 219 is mounted on the top cover 214 of the ink reservoir 201 to fit the ink-injecting means 220 to the ink inlet port 211 of the ink reservoir 201 and the tank 219 is fixed by means of the fasteners 213 and 214. Then, the ink-injecting means 220 operates to charge the ink into the ink reservoir 201 to a definite level. As explained referring to FIG. 1, the ink inlet port 211 and the vent block 212 are positioned on the same side of the filter 205 (acting similarly to the filter 108 shown in FIG. 1) so that the ink levels on both sides of the filter 205 may reach the same height.

Figure 4:
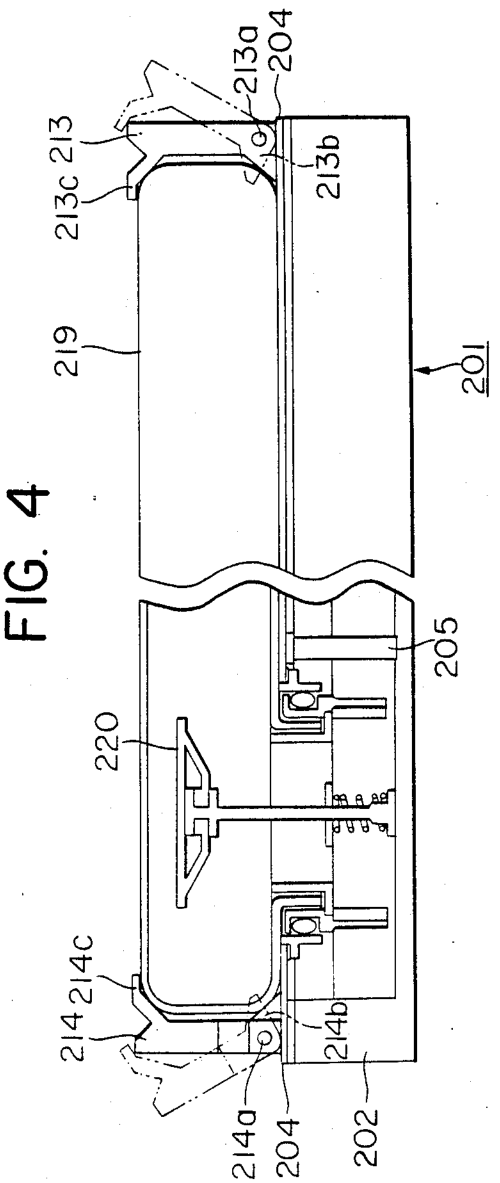

Referring now to FIG. 4, the tank fasteners 213 and 214 are described in some detail. FIG. 4 is a cross-sectional view taken in the longitudinal direction of the ink reservoir 201 and the ink-supplementing tank 219.

In FIG. 4, the same symbols as in FIG. 2 represent the same elements, of which explanations are therefore omitted. In the figure, 213*a* and 214*a* are pivot shafts for supporting the fasteners 213 and 214, respectively, said pivots being partly fixed to the top cover 204. The fasteners 213 and 214 are rotatable around the pivots 213*a* and 214*a*, respectively, as shown by the two-dot-dash lines, from the vertical positions shown by solid lines to nearly horizontal positions.

For mounting the ink-supplementing tank 219 on the ink reservoir 201, the ink-supplementing tank is placed in the definite position after tilting of the fasteners 213 and 214 to the positions shown by the two-dot-dash lines, thereby pushing down the respective lower end projections 213*b* and 214*b* of the fasteners 213 and 214 and simultaneously returning the fasteners 213 and 214 to the vertical positions shown by solid lines in the figure. At this time, respective clicks 213*c* and 214*c* of the fasteners 213 and 214 hook upper edges of the ink supplementing tank 219 to hold it. This holding force is roughly proportional to the total weight of the tank 219 itself and the ink contained therein.

Since the tank 219 is thus hooked to hold in the definite position as shown in the figure with a proper force which includes the weight of ink contained, there occurs no shift of the tank position, removal of the tank from the ink reservoir 201, or leakage of ink.

In order to exchange the tank 219 when the ink therein is consumed almost entirely, the fasteners 213 and 214 are tilted to the positions shown by the two-dot-dash lines, the tank 219 is removed, and another tank 219 filled with ink is mounted.

Figure 3:
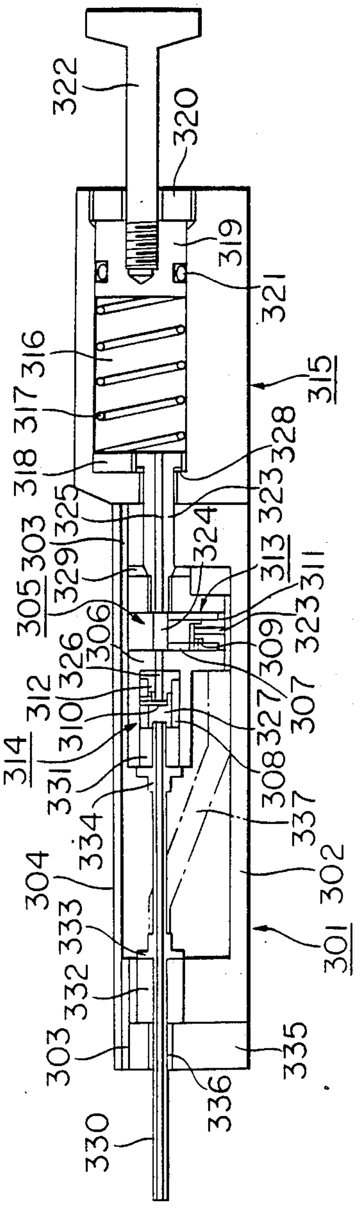
FIGS. 3 and 4 are cross-sectional views of the modified embodiment shown in FIG. 2.

FIG. 3 is a cross-sectional view, taken on line X-X' of FIG. 2, for illustrating details of the structures of the check valve 206 and cylinder block 210 of the embodiment shown in FIG. 2. In FIG. 3, 301 is an ink reservoir comprising an ink container 302, packing 303, and a top cover 304. The ink reservoir 301 contains a check valve 305 comprising a check elbow 306, wherein two back-flow-check valves 313 and 314 are disposed perpendicularly to each other. The two check valves 313 and 314 comprise valve holders 307 and 308, valves 309 and 310, and valve seats 311 and 312, respectively.

A cylinder block 315 contains the same number of cylinders 316 as the check valves 305. Each cylinder 316 has been constructed by inserting a spring 317, a spring seat 318, and a piston 319 therein and sealing the open end thereof with a cylinder closure 320. The piston 319 is provided with an O-ring 321 and a removable piston rod 322. The cylinder 316 communicates through a hollow joint 323 with an ink path 324 present between the back-flow-check valves 313 and 314 within the check valve 305. Packing members 328 and 329 prevent ink leakage around the joint 323.

An ink feed pipe 330 communicates with the check valve 305 at one end and with an ink feed tube (not illustrated) at the other end. The feed pipe 330 is fixed to the check valve 305 and to the ink container 302 through holding members 331 and 332, respectively. In addition, for preventing the movement of the feed pipe 330 that could be caused by connection or disconnection with the ink feed tube, sleeves 333 and 334 are attached to the holding members 331 and 332, respectively. A pipe guide 335 (common to all the ink feed pipes 330) prevents the falling-off of the holding 332 and ensures the fixing of the feed pipe 330. Ink leakage around the feed pipe 330 can be completely prevented by packing the clearance of a pipe-passing hole 336 with a sealant or the like. Reference numeral 337 indicates an ink feed pipe for connecting to another ink feed tube.

The initial ink supply to the ink-jetting head is carried out as follows: When the piston 319 is pushed with the piston rod 322 toward the left in the figure under the condition that the ink reservoir is filled with ink, the air in the cylinder 316 runs through paths 325, 324 and 326, opens the valve 310, and is expelled through the ink feed pipe 330. The piston 319, on removal of the applied pressure therefrom, is pushed back by the action of the spring 317, the valve 310 is closed by the suction pressure caused the cylinder 316 and the valve 309 opens, thereby sucking the ink within the ink container 302 into the cylinder 316 through the paths 323, 324 and 325. After the suction of ink into the cylinder 316 in this way, the piston 319 is again pushed toward the left in the figure to shut the valve 309 and open the valve 310, thereby supplying the ink sucked into the cylinder 316 to an ink-jetting head (not shown in FIG. 3) through the ink paths 325, 324, 326 and 327, the ink feed pipe 330, and the ink feed tube. In this manner, the initial ink supply to the ink-jetting head is continued until the ink-jetting head, ink feed tube, and ink feed pipe are filled with ink and bubbles are completely removed from the ink supply lines. For the purpose of securing the operation of the valves 309 and 310 and preventing the leakage of ink due to back pressure, the valve seats 311 and 312 have surfaces finished so as to tightly contact with the valves 309 and 310, respectively, and these contact surface areas are designed to be less than those of the valves 309 and 310, respectively. Moreover, the path 325 is located at a position lower than the center of the cylinder 316 so as not to allow the air remaining the cylinder 316 to flow into the path 325 by the action of the piston 319.

The ink supply to the ink-jetting head (not shown in FIG. 3) during the operation of the head to eject ink droplets is effected by the action of capillary force to suck the ink within the ink reservoir 301 through the ink feed pipes 330 and 337. Accordingly, the valves 309 and 310 are designed to open with a minimum forward pressure, and the ink level in the ink reservoir 301 is set so that the ink pressure in the ink-jetting head may be negative. As shown in FIG. 2, the check valves 206 having the same structure and operating in the same manner as 305 illustrated above are disposed parallel in the ink container 202. The number of the check valves 206 is same as that of the ink-jetting heads (not shown in FIG. 2).

In the present embodiment, there is no substantial pressure difference in supplied ink among the ink-jetting heads, since the ink is supplied to all the heads through almost the same length of line (the total length of the path in the valve 206, the feed pipes 207 and 208, and the feed tubes 217 and 218, as shown in FIG. 2).

Although not shown in FIG. 2, the cylinder block 210 contains the same number of cylinders and pistons as the check valves 206 corresponding thereto, these cylinders and pistons being the same ones as the cylinder 316 and the piston 319, respectively.

Because the cylinder case is a single body, each cylinder has improved mechanical strength and the junction between each cylinder and the corresponding check valve is easy to fix and the falling-off of the cylinder from the ink reservoir can be prevented completely.

As described in detail hereinbefore, the ink-supplying device of this invention is provided with ink-supplying systems of substantially the same specification, for supplying ink to a plurality of ink-jetting heads, so that stable ink supply can be performed uniformly to all regions of the ink-jetting heads.

In addition, according to this invention, the ink tank exchange operation is simple and required not so frequently because ink is supplied from a single source to a plurality of ink-jetting heads. Moreover, according to this invention, the ink delivery from a single source to a plurality of ink-jetting heads has various favorable effects such that a suitable amount of ink containing no contaminant can be supplemented nearly automatically to the single source of ink (the ink reservoir) according to the amount of ink consumed, the ink supplement requires very little labor, and the ink supplement causes no ink leakage.

What we claim is:

1. An ink-jet recording device, comprising a plurality of ink-jetting heads, each having a plurality of orifices able to apply ink to a recording medium simultaneously, a common reservoir for storing ink for jetting by all of said orifices and a system for supplying ink under pressure from said common reservoir to said heads, said system including a plurality of flow paths from said common reservoir to said heads and a plurality of ink-feeding means for pressurizing said flow paths to supply ink from said common reservoir under pressure to said orifices, wherein:

each of said flow paths is connected to a respective said head;

each of said heads comprises a respective intermediary reservoir for receiving ink from said common reservoir and for supplying the ink of said orifices; and each said flow path has a first pipe and a second pipe connected between said common reservoir and said respective intermediate reservoir, the first pipe being open to said common reservoir, the second pipe having two check valves with the same directional flow, and a respective said ink-feeding means being connected to the second pipe at a point between said check valves for individually pressurizing the second pipes.

* * * * *